United States Patent [19]

Endo

[11] 4,194,474
[45] Mar. 25, 1980

[54] EGR RECIRCULATION AT LOW LOAD IN INTERNAL COMBUSTION ENGINES

[75] Inventor: Yoshinori Endo, Hamamatsu, Japan

[73] Assignee: Yamaha Hatsudoki Kabushiki Kaisha, Iwata, Japan

[21] Appl. No.: 911,299

[22] Filed: Jun. 1, 1978

Related U.S. Application Data

[63] Continuation of Ser. No. 839,359, Oct. 4, 1977, abandoned.

[30] Foreign Application Priority Data

Mar. 9, 1977 [JP] Japan .................................. 52-106029

[51] Int. Cl.² ............................................ F02M 25/06
[52] U.S. Cl. ............................ 123/119 A; 123/325 T; 123/127; 123/75 B
[58] Field of Search ............... 123/119 A, 127, 325 T, 123/75 B

[56] References Cited

U.S. PATENT DOCUMENTS

| | | | |
|---|---|---|---|
| 3,882,831 | 5/1975 | Date et al. | 123/127 X |
| 3,941,105 | 3/1976 | Yagi et al. | 123/127 X |
| 4,014,960 | 3/1977 | Goto et al. | 123/127 X |
| 4,020,808 | 5/1977 | Yagi et al. | 123/119 A |
| 4,022,175 | 5/1977 | Laprade et al. | 123/119 A |
| 4,030,464 | 6/1977 | Yamaguchi et al. | 123/119A |
| 4,031,867 | 6/1977 | Yasuda et al. | 123/119 A |
| 4,051,824 | 10/1977 | Katsuhiko | 123/119 A |
| 4,058,098 | 11/1977 | Onaka | 123/119 A |
| 4,079,716 | 3/1978 | Nakagawa | 123/325 T |
| 4,086,885 | 5/1978 | Noguchi | 123/325 T |

FOREIGN PATENT DOCUMENTS

| | | | |
|---|---|---|---|
| 2521681 | 11/1975 | Fed. Rep. of Germany | 123/119 A |
| 2611806 | 9/1976 | Fed. Rep. of Germany | 123/119 A |

*Primary Examiner*—Wendell E. Burns
*Attorney, Agent, or Firm*—Ernest A. Beutler

[57] ABSTRACT

An internal combustion engine has a conventional principal induction passage. The engine is further provided with an auxiliary induction passage having a smaller cross-section and adapted to discharge a charge into a combustion chamber so as to cause turbulence therein. An auxiliary throttle valve downstream from the principal throttle valve of the system can be closed to cause the preponderant portion of the flow of air or of air/fuel mixture to flow through the auxiliary induction passage at light and medium loads. Exhaust gas recirculation is permitted at light and medium loads and is mixed with the air or air/fuel mixture at said low and medium loads and injected into the cylinder where it is well mixed by the resulting turbulence. As a consequence, higher concentrations of exhaust gas can be recirculated while still enjoying smooth engine operation.

9 Claims, 2 Drawing Figures

EGR RECIRCULATION AT LOW LOAD IN INTERNAL COMBUSTION ENGINES

CROSS REFERENCE TO RELATED APPLICATION

This application is a continuation of my copending application entitled EGR Recirculation at Low Load in Internal Combustion Engines, Ser. No. 839,359, filed Oct. 4, 1977, now abandoned.

BACKGROUND OF THE INVENTION

This invention relates to induction systems for internal combustion engines, and especially to an improved way of achieving exhaust gas recirculation therein.

It has been recognized that exhaust gas recirculation, which consists of bringing back a part of the exhaust gas to the intake side of an internal combustion engine is effective in limiting the generation of nitrogen oxides in the combustion chamber. However, too high a concentration of recirculated exhaust gas causes deterioration in the driveability of the vehicle. Therefore, in conventional internal combustion engines provided with exhaust recirculation systems, the recirculation rate is usually limited, which as a practical matter limits the effect in diminishing the amount of nitrogen oxides produced in the combustion chamber.

It is an object of this invention to overcome the above-described shortcoming of the prior art, by providing an improved internal combustion engine which can accommodate a larger rate of exhaust gas recirculation without being accompanied by deterioration of the driveability of the vehicle.

SUMMARY OF THE INVENTION

This invention is carried out with an internal combustion engine which has a principal induction passage leading to an intake port of the engine in which is positioned a principal throttle valve. An auxiliary throttle valve is provided in the principal induction passage, and an auxiliary induction passage extends from a point between the two throttles to a region adjacent to the intake port of the combustion chamber. The auxiliary induction passage has a smaller cross-sectional area than that of the principal induction passage. An exhaust gas recirculation system is provided which includes a conduit extending from the exhaust pipe to the principal induction passage. The exhaust gas is delivered to a portion of the induction passage where pulsations will be absorbed. The auxiliary throttle valve is closed at light and medium loads. Accordingly, the recirculating exhaust gas is fed to the combustion chamber through the auxiliary induction passage at least during the light and medium load operation of the engine. Thus, in the light and medium load operation of the engine, the recirculated exhaust gas is jetted into the combustion chamber at a high velocity to form a strong swirl in the combustion chamber so that the exhaust gas and the mixture in the combustion chamber are mixed uniformly. Therefore it becomes possible to increase the amount of recirculated exhaust gas (i.e., to increase the recirculation rate) while still maintaining stable combustion in the combustion chambers. Accordingly, the amount of nitrogen oxides produced can be significantly reduced without deteriorating the driveability of the vehicle.

According to a preferred but optional feature of the invention, the exhaust gas is returned to the principal induction passage between the throttles in a place where the passage volume is enlarged so that it serves as a surge tank or plenum to absorb or cushion the surging or pulsation of exhaust pressure, thereby insuring a more uniform mixing of the recirculated exhaust gas and the combustable mixture.

DETAILED DESCRIPTION OF THE PREFERRED EMBODIMENTS

Figure 1:
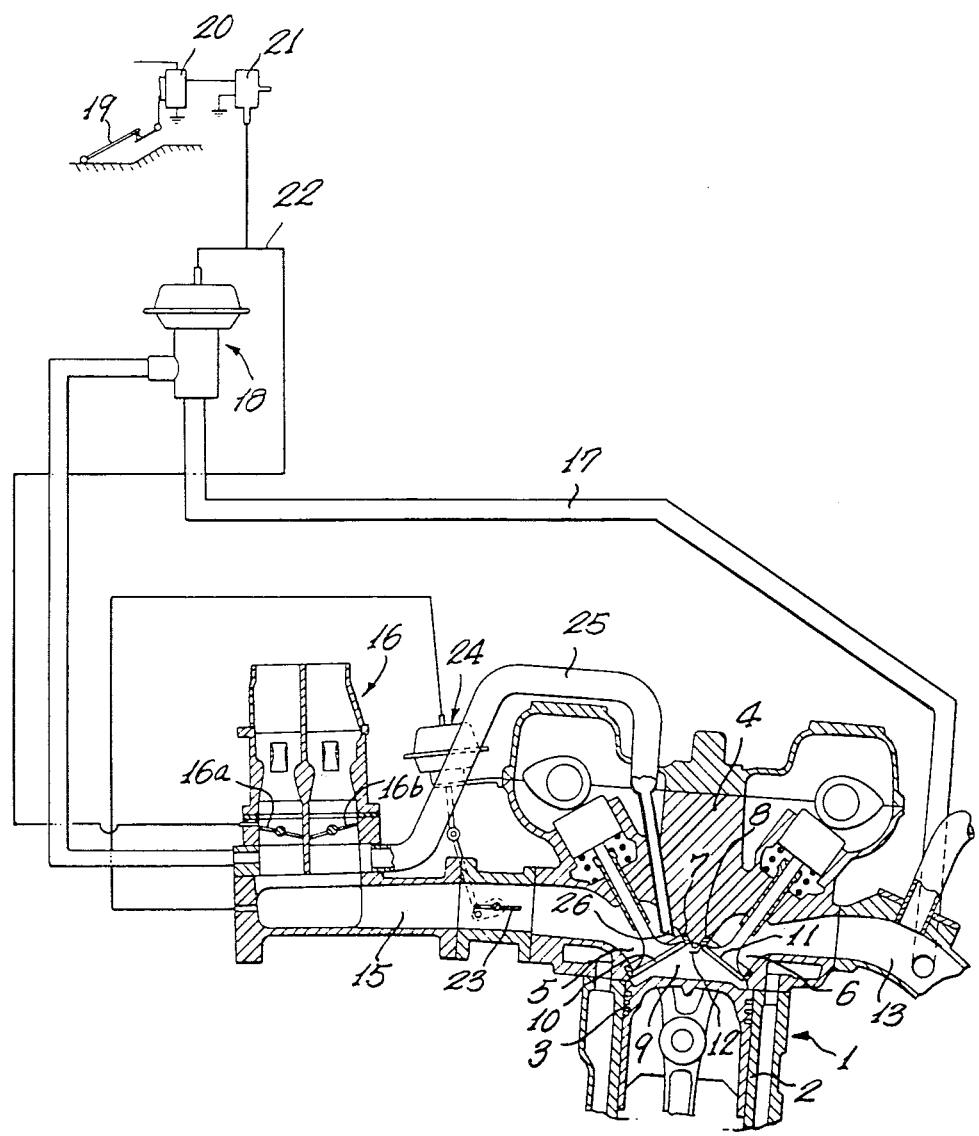
FIG. 1 is a fragmentary side elevation of an internal combustion engine incorporating a system according to the invention with certain portions being shown schematically.

With reference to FIG. 1, which shows the presently preferred embodiment of the invention, an internal combustion engine is shown with a plurality of cylinders 2 (only one of which appears in the drawing) formed in a cylinder block 1. A piston 3 is adapted to be reciprocally moved in each of cylinders 2. A cylinder head 4 is secured to the upper end of each cylinder block 1 and cooperates with the cylinder 2 and piston 3 in defining a combustion chamber 9. An intake port 5 and an exhaust port 6 are formed in the cylinder head 4 and open into the combustion chamber 9.

The intake exhaust ports 5 and 6 are provided with respective inserted valve seats 7 and 8 around their peripheries, while cooperative intake and exhaust valves 10, 11, respectively, are mounted on the cylinder head 4. The valves 10 and 11 are operated to open and close their respective ports 5 and 6 in synchronization with movement of the piston 3 by a valve actuating mechanism of any known type.

The cylinder head 4 has an ignition plug 12 positioned therein within each combustion chamber 9. The exhaust ports 6 of each respective combustion chamber 9 is connected to an exhaust manifold 13 in a known manner, while the intake port 5 is connected to a principal induction passage 15 formed by an intake manifold to which air/fuel mixture is supplied by carburetor 16 which has principal throttle valve 16a (the primary throttle valve) and a secondary throttle valve 16b.

The exhaust gas recirculation system comprises a recirculation passage 17 which opens at one end in the exhaust manifold 13 and at its other end in induction passage 15 downstream from principal throttle valve 16a. A control valve 18 is disposed in the exhaust gas recirculation passage 17. The control valve is adapted to be actuated by a pressure difference generated in part by a vacuum line 22 which in turn is adapted to be opened and closed by an electromagnet valve 21 combined with a switch 20 all in a known manner. The switch 20 is associated with an accelerator pedal 19 so that the control valve 18 will open the recirculation passage when the engine is operated at light and medium load ranges.

An auxiliary throttle valve 23 is placed in the principal induction passage 15 downstream from the throttle valves 16a and 16b. Auxiliary throttle valve 23 is adapted to be actuated by, for example, a vacuum actuator 24 which is adapted to be operated in response to the intake vacuum established in the principal induction passage 15 between throttle valves 16a and 16b and the auxiliary throttle valve 23, so it closes the principal induction passage 15 in the light and medium load range.

An auxiliary induction passage 25 is provided to detour or by-pass auxiliary throttle valve 23. Auxiliary induction passage 25 has its upstream side opening in the principal induction passage 15 at a location between the two throttles i.e., upstream from auxiliary throttle 23 and downstream from the principal throttle valve 16a. Its downstream discharge port 26 comprises a nozzle located in the vicinity of intake port 5 which is directed toward the combustion chamber 9. It will be noted that the discharge port 26 and associated nozzle are disposed at a substantially different angle from the portion of the main intake passage at the port 5. Therefore, a charge issuing from the auxiliary induction passage 25 will enter the chamber 9 at a substantially different angle from the charge entering from the port 5.

The auxiliary induction passage 25 has a much smaller cross-section area than that of the principal induction passage 15. Therefore, when the auxiliary throttle valve 23 is closed, the air/fuel mixture flows through the auxiliary induction passage 25 instead, and into the combustion chamber 9 at an extremely high speed through the nozzle 26.

Figure 2:
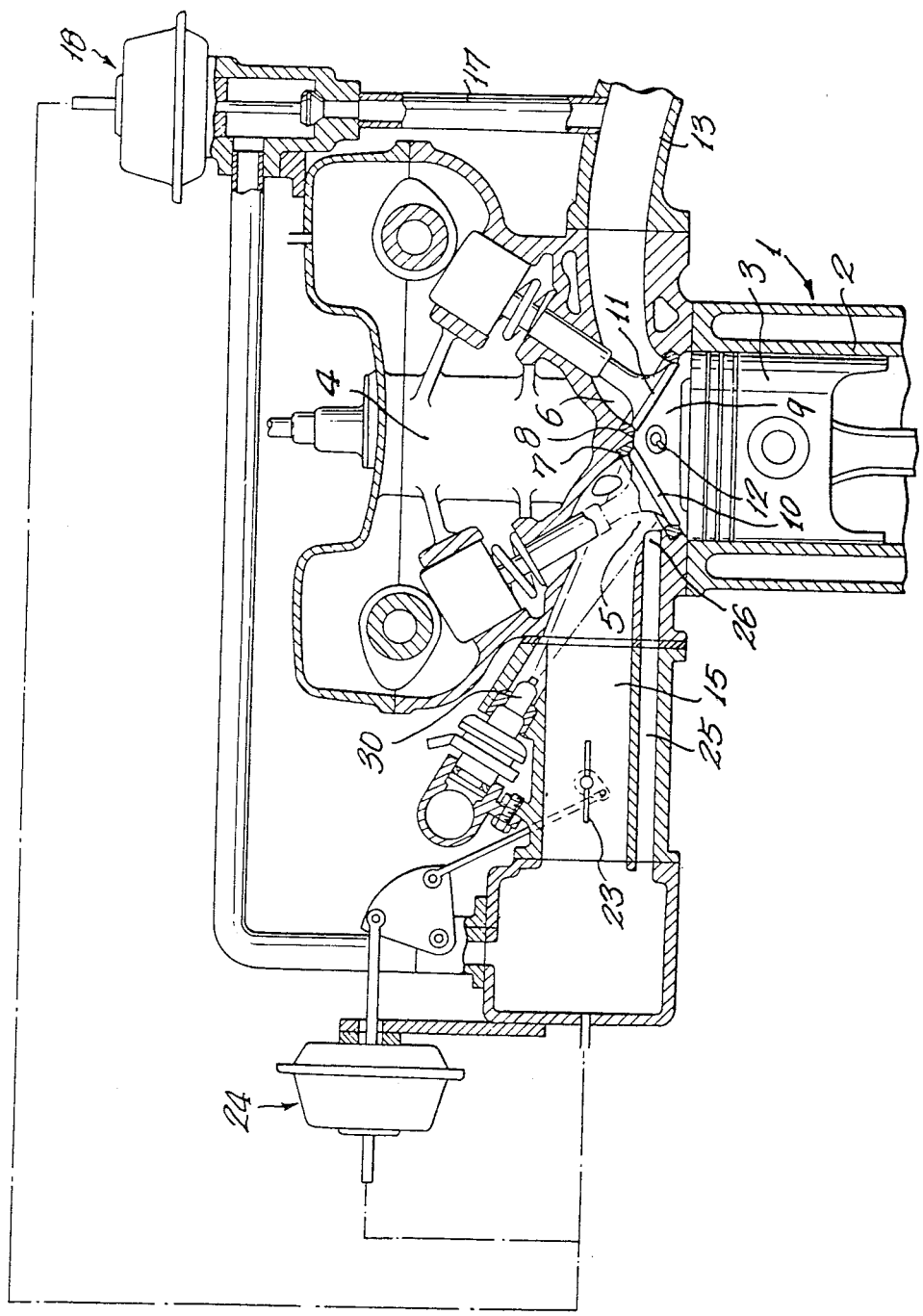
FIG. 2 is a view similar to FIG. 1 showing another embodiment of the invention.

FIG. 2 shows the engine of FIG. 1 utilizing fuel injection techniques instead of a carburetor. Like numbers are used for like parts, and the description of these components will not be repeated. Auxiliary passage 25 in FIG. 2 extends alongside passage 15. In this embodiment air and recirculated exhaust gas flow in passages 15 and 25, and the fuel is injected toward intake port 5 by fuel nozzle 30. At the upstream end there is an air metering means (not shown) such as a primary throttle valve for supplying air to the induction passages, and a means (not shown) for metering fuel is also provided. Operation of this system is the same as described before, except that only air flows in passages 15 and 25, instead of air/fuel mixture.

It will be noted that the exhaust gas returned to the induction system through the control chamber 18 will enter into the induction system at an enlarged volume of the intake manifold system at the point where the auxiliary induction passage 25 has its inlet. This enlarged volume acts like a plenum chamber so as to damp pulsations in the exhaust gas from the individual chambers 9. Thus, pulsations are not experienced at the point of discharge into the combustion chambers 9.

As has been described, in the illustrated internal combustion engine the auxiliary throttle valve is closed at light and medium load ranges at which exhaust gas recirculation takes place, so that the combustible air/fuel mixture including the recirculated combustion gas is jetted into the combustion chamber at a high speed so as to create a strong swirl of the combustion chamber, thereby to insure a good mixing of the air/fuel mixture with a recirculated combustion gas and consequent good ignitability.

Further with regard to FIG. 1 it will be seen that the exhaust gas conduit 17 enters the principal induction passage in the left-hand barrel of the carburetor where a wall stands between it and the entrance to the auxiliary induction passage 25. Therefore, there is no direct confrontation of the two conduits and no direct transmission to the auxiliary induction passage of pulsations in the exhaust gases.

This invention is not to be limited by the embodiments shown in the drawings and described in the description, which are given by way of example and not of limitation, but only in accordance with the scope of the appended claims.

I claim:

1. In an internal combustion engine having a variable volume chamber in which combustion occurs, a main intake passage communicating with said chamber through a main intake port for delivering a charge thereto, an exhaust passage communicating with said chamber for receiving a burned charge exhausted therefrom, and an emission system for discharging exhaust gas from said exhaust passage for further treatment by combustion within said chamber, the improvement comprising an auxiliary intake passage having an inlet communicating with said main intake passage and an outlet communicating with said chamber through auxiliary port means, said auxiliary intake passage having an effective cross-sectional area substantially less than the effective cross-sectional area of said main intake passage for causing a given mass flow of charge through said auxiliary intake port to enter said chamber at a significantly greater velocity, throttle valve means for controlling the ratio of flow into said chamber through said main intake port to the flow into said chamber through said auxiliary intake port means, and means for delivering exhaust gases from said emission system to said main intake passage in a location to minimize the effects of pulsation thereof and for introduction at a high velocity into said chamber through said auxiliary intake port means under the control of said throttle valve means.

2. Apparatus according to claim 1 in which the main induction passage is enlarged whereby to form a surge chamber to damp the pulsations of the exhaust gas.

3. Apparatus according to claim 1 in which the exhaust gas enters the main induction passage where it does not directly face the opening into the auxiliary induction passage.

4. Apparatus according to claim 1 further including a carburetor for delivering a fuel air charge to at least one of said induction passages.

5. Apparatus according to claim 1 further including air metering means, fuel metering means, and fuel injection means for delivering a fuel air charge to at least one of said induction passages.

6. Apparatus according to claim 4 in which the main induction passage is enlarged whereby to form a surge chamber to damp the pulsations of the exhaust gas.

7. Apparatus according to claim 4 in which the exhaust gas conduit enters the main induction passage where it does not directly face the opening into the auxiliary induction passage.

8. Apparatus according to claim 1 further including a baffle interposed between the point where the exhaust gases are introduced into the main intake passage and the inlet of the auxiliary intake passage for precluding the transmission of exhaust gas pulses to said inlet.

9. Apparatus according to claim 4 wherein the carburetor comprises a staged two-barrel carburetor, the inlet for the auxiliary intake passage being positioned in communication with the primary stage of said carburetor, the exhaust gases being delivered to the main intake passage in communication with the secondary stage of said carburetor.

* * * * *